United States Patent [19]

Liggett

[11] 4,066,736

[45] Jan. 3, 1978

[54] PROCESS FOR PRODUCING CONCENTRATED SOLUTIONS OF HYDROXYLAMMONIUM NITRATE AND HYDROXYLAMMONIUM PERCHLORATE

[75] Inventor: Thomas Liggett, Indian Head, Md.

[73] Assignee: The United States of America as represented by the Secretary of the Navy, Washington, D.C.

[21] Appl. No.: 668,569

[22] Filed: Mar. 19, 1976

[51] Int. Cl.$^2$ .............................................. C01B 21/14
[52] U.S. Cl. .................................... 423/386; 423/387; 423/476; 423/554; 423/555
[58] Field of Search ............... 423/387, 476, 386, 395, 423/385

[56] References Cited

U.S. PATENT DOCUMENTS 2,768,874  10/1956  Robson ................................ 423/386

OTHER PUBLICATIONS

Mellor, "A Comprehensive Treatise on Inorganic & Theoretical Chemistry", Longmans, Green & Co., New York, N.Y., vol. VIII, 1928, p. 303.

*Primary Examiner*—Earl C. Thomas
*Attorney, Agent, or Firm*—R. S. Sciascia; A. L. Branning; H. B. Field

[57] ABSTRACT

A process for preparing concentrated solutions of hydroxylammonium nitrate (HAN) or hydroxylammonium perchlorate (HAP) which comprise reacting hydroxylammonium sulfate with either barium nitrate or barium perchlorate, in such a way that the dissolved barium salt is reacted with the dissolving hydroxylammonium sulfate while agitating the system so as to keep the slurried barium salt from directly contacting the hydroxylammonium sulfate. The rate of addition of the hydroxylammonium sulfate is slower than the rate of solution of the barium salt. An excess of barium nitrate or barium perchlorate ions is needed in the solution to which the hydroxylammonium sulfate is added until the reaction is terminated. The concentration of the HAN or HAP in the final solution can be increased still further if a solution of HAN or HAP is respectively used in forming the barium salt slurry.

12 Claims, No Drawings

PROCESS FOR PRODUCING CONCENTRATED SOLUTIONS OF HYDROXYLAMMONIUM NITRATE AND HYDROXYLAMMONIUM PERCHLORATE

BACKGROUND OF THE INVENTION

The present invention relates to a process for the production of concentrated solutions of hydroxylammonium nitrate (HAN) and hydroxylammonium perchlorate (HAP). More particularly, hydroxylammonium sulfate is added to a slurry of either barium nitrate or barium perchlorate at a rate which is slower than the rate of solution of the barium salt. This permits dissolved barium salt to react with the dissolving hydroxylammonium sulfate thereby obtaining solutions of either hydroxylammonium nitrate or hydroxylammonium perchlorate.

Concentrated HAN and HAP solutions are traditionally made by vacuum evaporation of water from dilute HAN or HAP solutions. The dilute solutions are made by stoichiometric reaction of a saturated barium nitrate or barium perchlorate solution with hydroxylammonium sulfate (HAS). The maximum concentration of the HAN or HAP solutions that can be initially obtained from a saturated, boiling water solution of barium salt is about 20%. However, since the product stability of the HAN and HAP can be affected by the temperature of boiling water, the reaction is actually conducted at lower temperatures and yields about a 15% solution.

The dilute HAN and HAP solutions are removed from the by-product barium sulfate precipitate by decantation after settling. The precipitate is so fine that normal filtration and washing are difficult and several washes are required to minimize product losses. The concentration at the start of vacuum evaporation is normally about 10% HAN or HAP and solutions of varying concentrations may ultimately be prepared. Because of the heat sensitivity of both the HAN and of the HAP, concentrating the product is a long, slow, dangerous process.

Previous attempts to obtain more concentrated solutions from the original reaction have repeatedly shown, that unless the barium salt was dissolved before mixing, the results were erratic and considerable barium salt remained unreacted.

SUMMARY OF THE INVENTION

Accordingly, the present invention provides a new, improved and rapid method for the preparation of concentrated hydroxylammonium nitrate and concentrated hydroxylammonium perchlorate solutions. In this process a hydroxylammonium salt is slowly added to a well agitated slurry of either barium nitrate or barium perchlorate. The agitation must be sufficiently vigorous so as to insure that the hydroxylammonium salt goes into solution and reacts with the dissolved barium salt and does not come into direct contact with the slurried barium salt. Should this undesirable direct contact occur, the soluble salt will receive an insoluble coating and the reaction will be prematurely curtailed.

OBJECTS OF THE INVENTION

It is therefore an object of the present invention to provide a new process for the production of concentrated hydroxylammonium nitrate and hydroxylammonium perchlorate solutions.

Another object of the present invention is to provide a method for increasing the production rate of concentrated hydroxylammonium nitrate and hydroxylammonium perchlorate solutions.

Yet another object of the present invention is to provide a safe method for the production of concentrated hydroxylammonium nitrate and hydroxylammonium perchlorate solutions wherein, there is no possibility of obtaining the very heat sensitive anhydrous HAN or anhydrous HAP.

Still a further object of the present invention is to provide an economical means for the production of concentrated hydroxylammonium nitrate and hydroxylammonium perchlorate solutions.

Other objects and many of the attendant advantages of this invention will be readily appreciated as the same becomes better understood by reference to the following detailed description.

DESCRIPTION OF THE PREFERRED EMBODIMENTS

In accordance with the present invention concentrated solutions of hydroxylammonium nitrate, $NH_2OH.HNO_3$, or hydroxylammonium perchlorate can be prepared in the following manner. A hydroxylammonium salt such as hydroxylammonium sulfate or hydroxylammonium acid sulfate or solutions thereof is slowly added to a warm well agitated slurry of a nitrate or perchlorate salt. Although, this is the most common method of adding the reactants, it would be possible to add them in reverse order if the nitrate or perchlorate salt selected was found to be more soluble than the hydroxylammonium salt selected for the process.

The temperature of the slurry may vary from very hot to very cold. However, in exceptionally cold temperatures the solubility and rate of solution of the nitrate or perchlorate salt decreases, thereby requiring excessive time to attain concentrated HAN or HAP solutions. At exceptionally high temperatures, near boiling, the stability of the hydroxylammonium nitrate and the hydroxylammonium perchlorate may be adversely affected. Therefore, the preferred temperature range for this operation is from 25° to 60° C. It should however be noted that solutions with low concentrations of HAN or HAP permit the use of higher temperatures while solutions with high concentrations of HAN or HAP dictate the use of low temperatures.

The nitrate and perchlorate salts of barium and calcium are preferred for this reaction, however, nitrate and perchlorate salts of sodium, potassium and ammonium may also be used.

The solvent portion of the slurry may be any solvent in which the hydroxylammonium nitrate or hydroxylammonium perchlorate is soluble and the crystalline by-product is insoluble. The preferred solvents are water, water HAN solutions and water HAP solutions of almost any concentration. However, other organic solvents in which the hydroxylammonium nitrate and hydroxylammonium perchlorate are soluble and the crystalline by product is insoluble such as ether, diethyl ether, lower ethers, butanol, lower alcohols, HAN or HAP solutions of any of the above organic solvents and mixtures thereof also appear to be good solvents.

The hydroxylammonium salt may be added in crystalline form or in a suitable solvent to the nitrate or perchlorate salt slurry so long as the rate of addition is no greater than the rate of solution of the nitrate or perchlorate salt. This assures that there will always be free nitrate or perchlorate ions in solution to react with the dissolving hydroxylammonium salt or with the hydroxylammonium salt solution. Suitable solvents for the hydroxylammonium salt include water, ether, lower ethers, diethylether, butanol and lower alcohols. As the disassociated nitrate or perchlorate salts and the dissolved hydroxylammonium salt react, HAN or HAP can an insoluble by-product are formed. As the reaction continues, the dissolved nitrate or perchlorate salt is consumed thereby permitting additional suspended nitrate or perchlorate salt to be dissolved. Concurrently, insoluble by-product precipitates out of solution and is kept in a suspension by continuous agitation. This process continues until all available nitrate or perchlorate salt has been dissolved or reacted, or until all of the hydroxylammonium salt has been reacted, or until the slurry can no longer be easily maintained.

Because of the highly reactive nature of the sulfate ion it is important to maintain a well agitated slurry wherein the nitrate or perchlorate salt and the reactive sulfate ions, from the hydroxylammonium salt, are kept well separated. If this is not accomplished, and the sulfate ion is permitted to contact the slurried nitrate or perchlorate salt, a surface reaction will take place and the once soluble slurried salt will be coated with the insoluble sulfate by-product. This will render the nitrate or perchlorate salt virtually insoluble thereby putting a premature end to the reaction.

Once the reaction is completed, the insoluble by-product can be separated from the HAN or HAP solution by settling and decanting or any other appropriate means.

The HAN or HAP concentrations obtainable in one step appears only limited by the slurry concentrations that can be kept well agitated and conveniently separated from the liquid product. Multiple steps may be used to reach the final concentration if it is more convenient that the one step process.

Although gravity and centrifugal separation are presently most convenient, other means of separation as known to the art, such as filtration with or without filter aids, might also be used.

While it is not desired to be bound to any particular theory, the following explanation is a possible mechanism which may help to explain the startling results obtained by this invention. An excess of nitrate or perchlorate salt is added to an agitated solvent and the mixing continues as this solute goes into solution. The excess solute is then kept in a suspended state and will be kept separate from the reactive sulfate by constantly agitating the system. The hydroxylammonium salt or hydroxylammonium salt solution is then added to the agitated solution and it is likewise dissolved. Upon entry into solution the ions of the hydroxylammonium salt react with available nitrate or perchlorate ions thereby yielding dissolved hydroxylammonium nitrate or hydroxylammonium perchlorate and insoluble by-product. As the reaction continues, the concentration of dissolved nitrate or perchlorate salt has a tendency to decrease. However, since the hydroxylammonium salt ions are added at a rate which is slower that the rate of solution of the nitrate or perchlorate salt, the suspended nitrate or perchlorate salt enters into solution and immediately replaces those ions which are consumed during the reaction. This process will continue until either all of the slurried salt or hydroxylammonium salt or both are consumed, or until the reactive hydroxylammonium sulfate can no longer be easily kept away from the slurried salt. Once this occurs the reaction stops and the insoluble by-product is separated from the concentrated HAN or HAP solution by any appropriate method. If more concentrated solutions are needed, this process may be repeated until the desired concentration is obtained.

Although there are many important factors disclosed herein there are three things of major importance. First, an excess of positive ions from the nitrate or perchlorate salt does not prevent the hydroxylammonium salt from dissolving and entering the reaction. Secondly, the disclosed nitrate salts are soluble in both dilute and concentrated HAN or HAP solutions. Thirdly, if the reactive sulfate from the hydroxylammonium sulfate is permitted to come in contact with the slurried salt, a surface reaction will take place, the slurried salt will be coated by the insoluble sulfate thereby preventing the slurried nitrate or perchlorate salt from going into solution and putting a premature end to the reaction.

By way of example, and not limitation, the following process and test results are given.

EXAMPLE 1

A 33.1% hydroxylammonium nitrate solution was made by slowly adding 251 parts of HAS to an agitated slurry of 400 parts barium nitrate suspended in 546 parts of distilled water at a temperature of between 50° and 60° C. The hydroxylammonium sulfate (HAS) was added in batches of about 25 parts each, at about 5 minute intervals.

EXAMPLE 2

A 49.3% HAN solution was made by adding 251 parts of HAS to an agitated slurry of 400 parts barium nitrate suspended in 290 parts of distilled water at between 50° and 60° C. The HAS was added in batches of under 2 parts each at 15 second intervals over about 45 minutes. The 15 second addition intervals were used to simulate continuous addition which would be preferable if suitable slow feeding equipment were available.

EXAMPLE 3

A 58.6% HAN solution was made by reacting the same quantities of HAS and barium nitrate suspended in 450 parts of a 33.5% HAN solution prepared from previous made batches and washes. The temperature was kept between 40° and 50° C while the HAS was added at 15 second intervals over about 40 minutes time.

EXAMPLE 4

A 78.2% HAN solution was made by reacting the same quantities of HAS and barium nitrate slurried in 300 parts of a 54.4% HAN solution at 53° to 57° C. The HAS was added at 15 second intervals over about 45 minutes.

EXAMPLE 5

An 84.4% HAN solution was made by reacting the same quantities of HAS and barium nitrate slurried in 520 parts of a 77.0% HAN solution at 46° to 48° C with the HAS added at 15 second intervals over 25 minutes.

The 33.1% HAN solution was separated from the by-product barium sulfate by settling and decanting. A centrifuge was used to remove the barium sulfate from all the other batches.

Thus it is apparent that there is provided by this invention a rapid, safe, economical process for producing concentrated hydroxylammonium nitrate solutions.

It is to be understood that what has been described is merely illustrative of the principles of the invention and that numerous arrangements in accordance with this invention may be devised by one skilled in the art without departing from the spirit and scope thereof.

What is new and desired to be secured by Letters Patent of the United States is:

1. In a process for producing concentrated hydroxylammonium nitrate solutions by reacting an alkaline earth nitrate salt selected from the group consisting of barium nitrate and calcium nitrate with a hydroxylammonium salt selected from the group consisting of hydroxylammonium sulfate and hydroxylammonium acid sulfate, the improvement comprising:

adding the hydroxylammonium salt to a slurry of particles of the alkaline earth nitrate salt suspended in a solvent selected from the group consisting of water and an aqueous hydroxylammonium nitrate solution at a rate which is slower than the rate of solution of the alkaline earth nitrate into the solvent so that an excess of alkaline earth ions over sulfate ions is maintained in the solvent to prevent the formation of a coating of the insoluble alkaline earth sulfate byproduct on the surfaces of the alkaline earth nitrate particles which would prematurely stop the reaction.

2. The process of claim 1 wherein the nitrate salt is suspended in the solvent by agitation.

3. The process of claim 1 wherein the hydroxylammonium salt is in solution.

4. The process of claim 1 wherein the hydroxylammonium salt is crystalline.

5. The process of claim 1 wherein the hydroxylammonium salt is hydroxylammonium sulfate.

6. The process of claim 1 wherein the alkaline earth nitrate salt is barium nitrate.

7. In a process for producing concentrated hydroxylammonium perchlorate solutions by reacting an alkaline earth perchlorate selected from the group consisting of barium perchlorate and calcium perchlorate with a hydroxylammonium salt selected from the group consisting of hydroxylammonium sulfate and hydroxylammonium acid sulfate, the improvement comprising:

adding the hydroxylammonium salt to a slurry of particles of the alkaline earth perchlorate salt suspended in a solvent selected from the group consisting of water and an aqueous hydroxylammonium perchlorate solution at a rate which is slower than the rate of solution of the alkaline earth perchlorate into the solvent so that an excess of alkaline earth ions over sulfate ions is maintained in the solvent to prevent the formation of a coating of the insoluble alkaline earth sulfate byproduct on the surfaces of the alkaline earth perchlorate particles which would prematurely stop the reaction.

8. The process of claim 7 wherein the perchlorate salt is suspended in the solvent by agitation.

9. The process of claim 7 wherein the hydroxylammonium salt is in solution.

10. The process of claim 7 wherein the hydroxylammonium salt is crystalline.

11. The process of claim 7 wherein the hydroxylammonium salt is hydroxylammonium sulfate.

12. The process of claim 7 wherein the alkaline earth perchlorate salt is barium perchlorate.

* * * * *